United States Patent [19]

Pritchard

[11] Patent Number: 4,887,121
[45] Date of Patent: Dec. 12, 1989

[54] METHOD AND APPARATUS FOR EXPOSURE CONTROL BASED ON COLOR BALANCE INFORMATION

[75] Inventor: Jeffrey A. Pritchard, Rochester, N.Y.

[73] Assignee: Eastman Kodak Company, Rochester, N.Y.

[21] Appl. No.: 282,730

[22] Filed: Dec. 12, 1988

[51] Int. Cl.⁴ .................. G03B 7/08; G03B 7/097; G03B 7/099; H04N 9/64

[52] U.S. Cl. .................. 354/430; 354/432; 354/443; 354/482; 358/29; 358/228

[58] Field of Search .............. 354/429–434, 354/441, 443, 482; 358/29, 225, 228

[56] References Cited

U.S. PATENT DOCUMENTS

| | | |
|---|---|---|
| 3,232,192 | 2/1966 | Stimson . |
| 3,955,208 | 5/1976 | Wick et al. ............. 354/227 |
| 4,366,499 | 12/1982 | Mir ............. 358/75 |
| 4,491,390 | 1/1985 | Tong-Shen ............. 350/331 R |
| 4,545,672 | 10/1985 | Ozawa ............. 355/3 R |
| 4,561,731 | 12/1985 | Kley ............. 350/510 |
| 4,774,564 | 9/1988 | Konishi ............. 358/29 |

*Primary Examiner*—W. B. Perkey
*Attorney, Agent, or Firm*—David M. Woods

[57] ABSTRACT

A method and apparatus for exposure control in a camera is disclosed in which color balance information is used to select a weighted exposure measurement. A color balance signal is generated by measuring either light directly illuminating the camera or scene light passing through the lens system of the camera. The color balance signal is used to address a liquid crystal mask that selectively transmits a portion of the scene light to a group of photodetectors for a weighted exposure measurement.

13 Claims, 4 Drawing Sheets

METHOD AND APPARATUS FOR EXPOSURE CONTROL BASED ON COLOR BALANCE INFORMATION

BACKGROUND OF THE INVENTION

The present invention relates in general to exposure control systems, and in particular, to a method and apparatus for providing exposure control based on color balance information.

Typical exposure control systems employ a photodetector to measure the illumination intensity of the scene to be photographed. Significant exposure errors may occur, however, if the photodetector is arranged to measure average illumination of the scene, as the average illumination may differ significantly from a subject area of the scene. For example, exposure error will frequently occur when a person is photographed against a bright sky or indoors against a window.

Exposure control systems have been devised that employ multiple photodetectors to monitor various zones of the scene in order to provide proper exposure of the subject area. The illumination contrast between zones is then used to determine proper exposure control. Exposure control based on contrast analysis, however, has not been found to be entirely satisfactory. Complex algorithms must be employed to determine whether various illumination contrast conditions between zones is indicative of a daylight scene, indoor fluorescent lighting, tungsten lighting, etc., which adds to the complexity and expense of the exposure control system.

SUMMARY OF THE INVENTION

The present invention departs from the prior art use of contrast analysis to determine proper exposure control and instead employs color balance information to ascertain proper exposure of the scene being imaged.

More specifically, the present invention provides an exposure control system including a liquid crystal mask having a color balance section and an exposure measurement section, the exposure measurement section having a number of individually addressable exposure measurement segments and being arranged to receive scene light passing through a lens system of a camera, a first light transmissive element optically coupled to the color balance section and positioned to receive light illuminating the camera, a second light transmissive element optically coupled to the color balance section and the exposure measurement section, a plurality of photodetectors optically coupled to the second light transmissive element, and a processing unit coupled to the photodetectors and the liquid crystal mask.

In operation, the processing unit selectively addresses either the color balance section or the exposure measurement section of the liquid crystal mask and determines color balance information based on the output signals of the photodetectors. The processing unit then utilizes the color balance information to selectively address the exposure measurement segments of the exposure measurement section to obtain a weighted exposure measurement.

BRIEF DESCRIPTION OF THE DRAWINGS

With the above as background, reference should now be made to the following figures in which.

DETAILED DESCRIPTION OF THE PREFERRED EMBODIMENTS

The present invention will be discussed with reference to an electronic camera system, but it will be readily understood that the present invention can be employed in conventional film camera systems.

Figure 1:
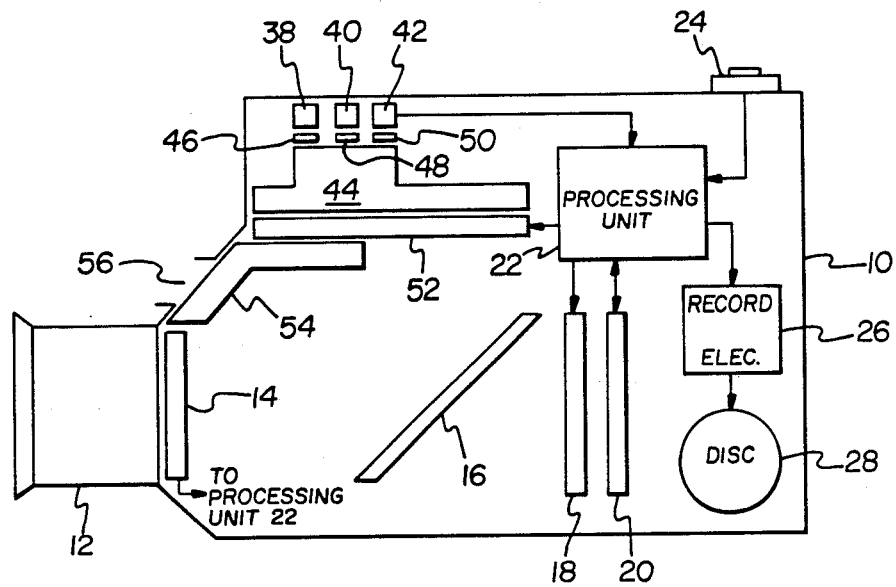
FIG. 1 is a schematic block diagram of a camera according to a first embodiment of the present invention.

Referring now to FIG. 1, an electronic camera 10 is shown having a lens system 12, a diaphragm 14 to control the camera aperature, a beam splitter 16, a shutter 18 and an electronic imager 20. The operation of the diaphragm 14, shutter 18 and electronic imager 20 are controlled by a processing unit 22 which is also coupled to operator controls 24. The processing unit 22 includes video processing circuitry (not shown) for generating a composite video signal based on the output signal from the electronic imager 20. The composite video signal generated by the processing unit 22 is supplied to recording electronics 26 for recording on a recording disc 28. Alternatively, the composite video signal may be stored in a framestore or supplied to an external device such as a monitor.

Figure 2:
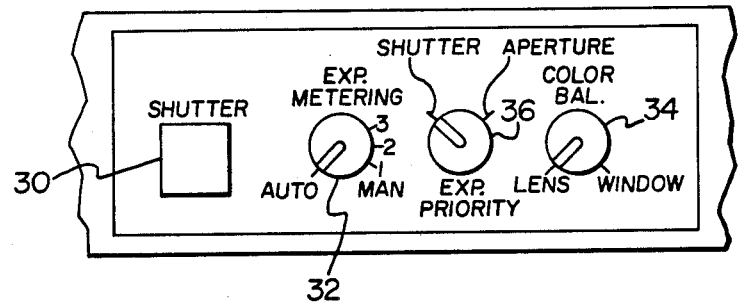
FIG. 2 is a diagram of operator controls employed the camera in illustrated in FIG. 1.

The operator controls 24, which may take the form of a keypad, buttons, switches, etc., are used by an operator to input command signals to the processing unit 22. In a preferred embodiment shown in FIG. 2, the operator controls 24 include a shutter release button 30, auto/manual exposure metering selector 32, color balance mode selector 34, and a exposure priority mode selector 36. Other various combinations of operator controlled functions are of course possible.

Both color balance and exposure information measurements are made by a group of photodetectors 38-42 that are optically coupled to a light pipe 44. Color filters 46-50 (red, green, blue) are interposed in the light path between the photodetectors 38-42 and the light pipe 44, such that each of the photodetectors 38-42 measures a particular color component of the received light. It will be understood that while the embodiment illustrated in FIG. 1 employs three photodetectors to detect red, green and blue light, sufficient color balance information may be obtained by detecting only two colors.

The light pipe 44 is positioned above a liquid crystal mask 52 and light is selectively passed through the liquid crystal mask 52 to the light pipe 44 from two sources, either directly from the beam splitter 16 or from a second light pipe 54 which receives light via a wide angle window 56 provided in the housing of the camera 10. Preferably, an ultraviolet filter (not shown) is provided between the light pipe 44 and the liquid crystal mask 52. The window 56 is utilized to measure light illuminating the camera as a whole while the light received from the beam splitter 16 represents the scene actually being imaged by the electronic imager 20.

Each of the light pipes 44 and 54 is constructed of an optically transmissive plastic material that is coated with a reflective material (such as aluminum) except where a light path is required, for example, to receive light from the window 56 and transmit the light to the liquid crystal mask 52 in the case of light pipe 54 and to receive light from the liquid crystal mask 52 and transmit the light to the photodetectors 38-42 in the case of light pipe 44.

Figure 3:
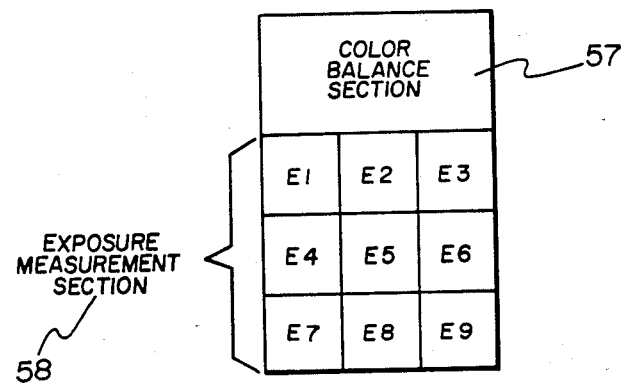
FIG. 3 is a diagram of a liquid crystal mask incorporated in the camera illustrated in FIG. 1.

The liquid crystal mask 52 is divided into primarily two sections including a color balance section 57, that is located adjacent the second light pipe 54, and an exposure section 58 that includes a number of exposure measurement segments E1-E9 as illustrated in FIG. 3. It will be readily apparent that the exposure measurement segments E1-E9 of the exposure section 58 and color balance section 57 may be configured to any desired pattern and are not limited to the configuration illustrated in FIG. 3. The color balance section 57 and each of the exposure measurement segments E1-E9 includes a plurality of light valve elements (for example liquid crystal devices) that are commonly addressable by the processing unit 22, thereby rendering the color balance section 57 or exposure measurement segments E1-E9 transparent, to selectively pass light from either the beam splitter 16 or the second light pipe 54 to the photodetectors 38-42.

Figure 4:
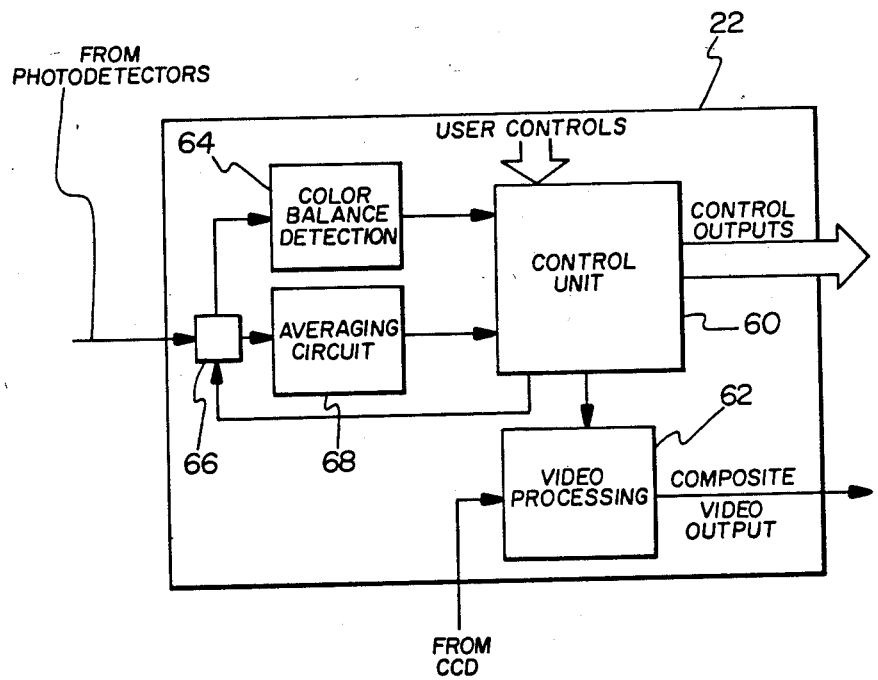
FIG. 4 is a schematic block diagram of a processing unit incorporated in the camera illustrated in FIG. 1.

The operation of the camera 10 will be explained with reference to FIG. 4, in which the processing unit 22 is shown having a control unit 60, video processing circuitry 62, a color balance detection circuit 64, a switching circuit 66, and an averaging circuit 68. The control unit 60, upon receipt of a signal from the operation of the shutter button 30, initiates color balance detection by first determining the position of the color balance mode selector 34. For example, if the color balance mode selector 34 is set at "Window", the control unit 60 addresses the color balance section 57 of the liquid crystal mask 52 to render it transparent. The light illuminating the camera 10 is then supplied to the photodetectors 38-42 via the window 56, light pipe 54, liquid crystal mask 52, and light pipe 44.

When the camera 10 is in significantly different illumination than the scene, it is desirable that the light passing through the lens system 12 of the camera 10 be used to determine color balance. In such a case, the color balance mode selector 34 is set to the "Lens" position and the control unit 60 addresses exposure measurement segments E1-E9. Scene light is supplied to the photodetectors 38-42 via the lens system 12, beam splitter 16, liquid crystal mask 52, and light pipe 44.

The photodetectors 38-42 generate output signals proportional to the amount of light incident each photodetector. The output signals from the photodetectors 38-42 are supplied to the color balance detection circuit 64 that generates a color balance output signal indicative of the type of scene illumination. The control unit 60 receives the color balance output signal from the color balance detection circuit 64 and sets the proper exposure weighting by selectively addressing the exposure measurement segments E1-E9 based on the color balance signal, so that preselected patterns of the exposure measurement segments E1-E9 are rendered transparent for various lighting conditions, i.e., bottom row for daylight (E7-E9), center and bottom for tungsten lighting (E4-E9), and center row for fluorescent light (E4-E6).

The control unit 60 initiates exposure measurement by controlling the switching circuit 66 such that the output signals from the photodetectors 38-42 are supplied to the averaging circuit 68. The averaging circuit 68 averages the output signals from the photodetectors 38-42 and produces an exposure measurement signal which is supplied to the control unit 60. The control unit 60 controls the operation of the diaphragm 14 and shutter 18 (either aperature or shutter priority as determined by the setting of the exposure priority switch 36) to properly expose the electronic imager 20 based on the exposure measurement signal produced by the averaging circuit 68. Thus, the photodetectors 38-42 are utilized to detect both color balance information and exposure information.

The exposure weighting can also be set manually by the use of the exposure metering selector 32. The control unit 60 simply addresses the exposure measurement segments of the liquid crystal mask prespecified for the selected manual mode.

Figure 5:
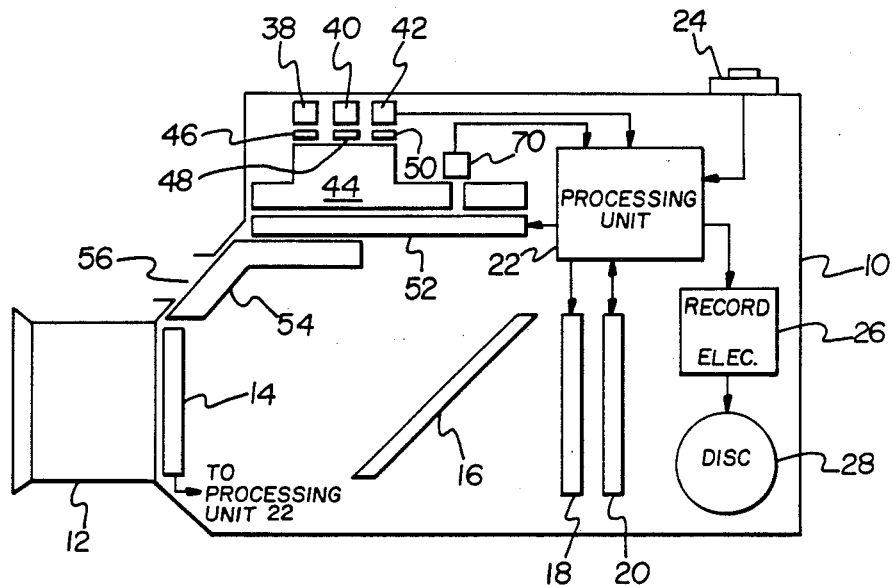
FIG. 5 is a schematic block diagram of a camera according to a second embodiment of the present invention.
Figure 6:
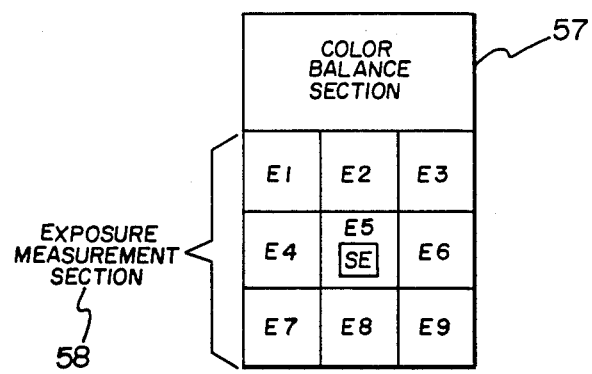
FIG. 6 is a diagram of a liquid crystal mask incorporated in the camera illustrated in FIG. 5.

A second embodiment of the invention is illustrated in FIG. 5, that includes a spot metering photodetector 70 located above a channel 72 provided in the light pipe 44. The liquid crystal mask 52 in the second embodiment has an additional spot exposure segment SE that is aligned with the channel 72 formed in the light pipe 44 as illustrated in FIG. 6. Spot metering can therefore be accomplished by having the control unit 60 address the spot exposure segment SE so that light is transmitted directly to the spot metering photodetector 70 through the channel 72.

Figure 7:
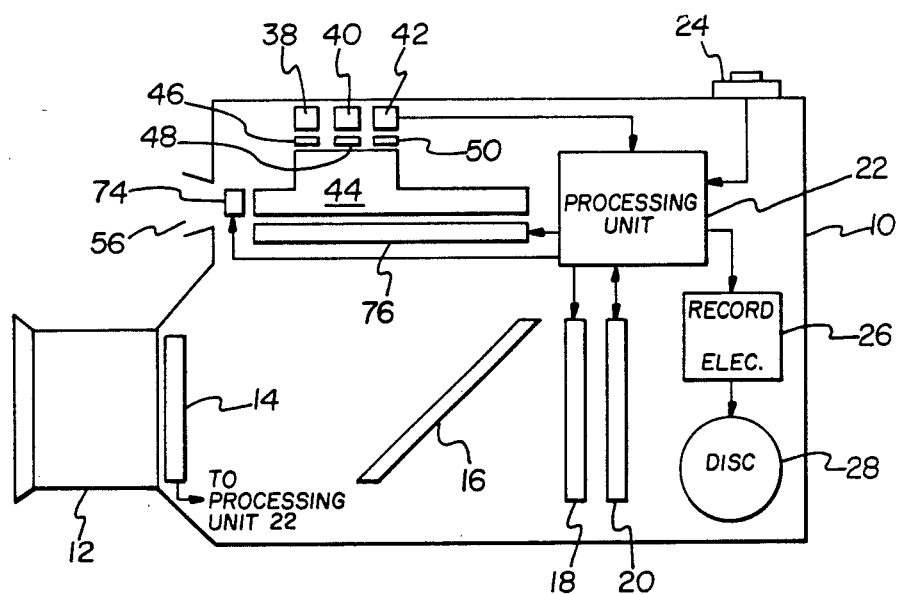
FIG. 7 is a schematic block diagram of a camera according to a third embodiment of the present invention.

A third embodiment of the invention is illustrated in FIG. 7, in which the second light pipe 54 of the embodiments illustrated in FIGS. 1 and 5 is eliminated. Instead, the third embodiment employs two liquid crystal masks 74 and 76. The first liquid crystal mask 74, the color balance mask, is located between the light pipe 44 and the window 56. The window 56 is located such the light passes directly into the light pipe 44 when the first liquid crystal mask 74 is addressed and rendered transparent by the processing unit 22. The second liquid crystal mask 76 contains a plurality of exposure segments similar to those found in the exposure measurement section 58 of the liquid crystal mask 52 of the first embodiment, and is arranged to selectively transmit light received from the beam splitter 16 to the light pipe 44. The embodiment illustrated in FIG. 7 has the advantage of a somewhat more compact structure, although two separate liquid crystal masks must be employed.

The invention has been described with reference to certain preferred embodiments thereof, but it will be understood that variations and modifications can be made within the spirit and scope of the claims. For example, the above-described exposure control system may be employed in conventional film cameras as well as electronic cameras as illustrated above. In such a case, the electronic imager 20, recording electronics 26, and recording disc 28 would be replaced by a film transport mechanism. The processing unit 22 may also be implemented using hardware circuits or a microprocessor.

What is claimed is:

1. An exposure control system for a camera comprising:
   a. a mask including a color balance section and an exposure measurement section, said exposure measurement section including a plurality of individually addressable exposure measurement segments and being arranged to receive scene light passing through a lens system of said camera;

b. a first light transmissive element optically coupled to said color balance section, said first light transmissive element being positioned to receive light illuminating said camera;

c. a second light transmissive element optically coupled to said color balance section and said exposure measurement section;

d. a plurality of photodetectors optically coupled to said second light transmissive element, each of said photodetectors being sensitive to a selected color component of light; and e. a processing unit coupled to said photodetectors and said mask, wherein said processing unit is configured to selectively address at least one of said color balance section and said exposure measurement section and determine color balance information based on the output signals of said photodetectors, and wherein said processing unit is configured to selectively address said exposure measurement segments based on said color balance information to obtain a weighted exposure measurement.

2. An exposure control system as claimed in claim 1, further comprising a spot metering photodetector coupled to said processing unit and positioned at one end of a channel formed in said second light transmissive element, wherein a second end of said channel is optically coupled to a spot exposure segment of said liquid crystal mask.

3. An exposure control system as claimed in claim 1, further comprising a diaphram and shutter mechanism coupled to said processing unit, wherein said processing unit controls the operation of said diaphram and said shutter mechanism based on said weighted exposure measurement.

4. An exposure control system as claimed in claim 1, wherein said mask comprises a plurality of liquid crystal devices.

5. An exposure control system for a camera comprising:

a. a color balance mask configured to receive light illuminating said camera;

b. an exposure measurement mask, including a plurality of selectively addressable exposure measurement sections, configured to receive light passing through a lens system of a camera;

c. a light transmissive element optically coupled to said color balance mask and said exposure measurement mask;

d. a plurality of photodetectors optically coupled to said light transmissive element; and e. a processing unit coupled to said color balance mask, said exposure measurement mask, and said photodetectors, wherein said processing unit is configured to address at least one of said color balance mask and said exposure measurement mask and determine color balance information based on signals received from said photodetectors, and wherein said processing unit is configured to selectively address said exposure measurement segments based on said determined color balance information to obtain a weighted exposure measurement.

6. An exposure control system as claimed in claim 5, further comprising a spot metering photodetector coupled to said processing unit and positioned at one end of a channel formed in said light transmissive element, wherein a second end of said channel is adjacent and optically coupled to a spot exposure segment of said exposure measurement mask.

7. An exposure control system as claimed in claim 5, further comprising a diaphram and shutter mechanism coupled to said processing unit, wherein said processing unit controls the operation of said diaphram and said shutter mechanism based on said weighted exposure measurement.

8. An exposure control system as claimed in claim 5, wherein said color balance mask and said exposure control mask each comprise a plurality of liquid crystal devices.

9. An exposure control system for a camera, said exposure control system comprising:

a. photodetector means for measuring color components of light incident said photodetector means;

b. optical means for selectively transmitting at least one of light illuminating said camera and light passing through a lens system of said camera to said photodetector means; and c. processing means for receiving an output signal from said detector means corresponding to the light transmitted to said photodetector means by said first optical means and determining color balance information based on said output signal, and for controlling said optical means based on said color balance information to selectively transmit a portion of the light passing through said lens system to said photodetector to obtain a weighted exposure measurement signal.

10. An exposure control system as claimed in claim 9, wherein said optical means comprises a first light transmissive member configured to receive light illuminating said camera, a liquid crystal mask configured to received light from said first transmissive member and light passing through a lens system of said camera, and a second light transmissive member configured to receive light from said liquid crystal mask.

11. An exposure control system as claimed in claim 9, wherein said optical means comprises a first liquid crystal mask configured to selectively transmit light illuminating said camera, a second liquid crystal mask configured to selectively transmit light passing through a lens system of said camera, and a light transmissive element configured to receive the light transmitted by said first and second liquid crystal masks.

12. An exposure control system comprising:

a. first means for generating a color balance signal;

b. second means for selectively passing portions of received scene light based on said color balance signal; and c. third means for measuring said portions of received scene light passed by said second means and determining proper exposure parameters based on said portions of received scene light.

13. A method of controlling exposure weighting comprising:

a. generating a color balance signal;

b. selectively passing portions of received scene light based on said color balance signal; and c. measuring the selectively passed portion of received scene light to determine proper exposure.

* * * * *